United States Patent [19]

Link

[11] Patent Number: 5,662,014

[45] Date of Patent: Sep. 2, 1997

[54] AUTOMATIC BAR STOCK FEEDING APPARATUS FOR MACHINE TOOLS, IN PARTICULAR AUTOMATIC LATHES

[75] Inventor: Helmut Friedrich Link, Aichwald, Germany

[73] Assignee: Index-Werke GmbH & Co., KG Hahn & Tessky, Esslingen, Germany

[21] Appl. No.: 524,221

[22] Filed: Sep. 6, 1995

[30] Foreign Application Priority Data

Sep. 7, 1994 [DE] Germany .................. 44 31 814.6

[51] Int. Cl.[6] .................................................. B23B 13/04
[52] U.S. Cl. ................... 82/125; 82/127; 82/129; 414/14; 414/17
[58] Field of Search .................. 82/125, 126, 127, 82/129; 414/14, 17, 18, 746.4

[56] References Cited

U.S. PATENT DOCUMENTS

| 3,131,587 | 5/1964 | Spohn et al. |
| 3,447,694 | 6/1969 | Hartle .................... 82/126 X |
| 4,640,157 | 2/1987 | Geiser et al. ............. 82/2.7 |
| 4,700,593 | 10/1987 | Cucci ..................... 82/127 |
| 4,929,138 | 5/1990 | Breuning ................. 82/125 X |
| 4,930,616 | 6/1990 | Lindberg ................. 414/746.4 |
| 4,953,429 | 9/1990 | Arisaka et al. .......... 82/127 |
| 5,062,330 | 11/1991 | Trautmann et al. |
| 5,115,702 | 5/1992 | Link ....................... 82/126 |

FOREIGN PATENT DOCUMENTS

| 0608490 | 11/1960 | Canada ..................... 82/125 |
| 0364656 | 4/1990 | European Pat. Off. .... 82/126 |
| 0 570 830 A1 | 11/1993 | European Pat. Off. |
| 1777170 | 1/1970 | Germany . |
| 2225049 | 12/1973 | Germany . |
| 2362130 | 7/1974 | Germany . |
| 3844337 | 7/1990 | Germany . |
| 2 196557 | 5/1988 | United Kingdom . |

*Primary Examiner*—Daniel W. Howell
*Assistant Examiner*—Henry W. H. Tsai
*Attorney, Agent, or Firm*—Leydig, Voit & Mayer, Ltd.

[57] ABSTRACT

Automatic apparatus for the feeding of bar-shaped stock to a machine tool, comprising an elongated receiving box which extends in feed direction, has a guide passage open at both ends for receiving a new stock bar and is formed by two receiving channels, an actuating device for the opening and closing of the receiving box as well as a pushing-in device for pushing a new stock bar in feed direction into the machine tool, wherein for simplifying the construction a clamping device is associated with the receiving box for securing a new stock bar in place in the receiving box and the latter is guided for displacement in feed direction and is displaceable back and forth in feed direction by the pushing-in device.

38 Claims, 5 Drawing Sheets

AUTOMATIC BAR STOCK FEEDING APPARATUS FOR MACHINE TOOLS, IN PARTICULAR AUTOMATIC LATHES

TECHNICAL FIELD OF THE INVENTION

Automatically operating machine tools, in particular automatic lathes, in which workpieces are produced from a bar-shaped stock, are customarily combined or rather provided with an automatically operating stock bar feeding apparatus which is designated in technical language as a bar loading magazine.

In the following, the present invention will be explained on the basis of automatic lathes although the invention can, in principle, also be used on other machine tools, such as, for example, machine saws, to which the material to be machined is fed in bar form.

BACKGROUND OF THE INVENTION

In automatic lathes of the type in question, a stock bar which is just being machined and which is held and guided in the associated stock bar feeding apparatus concentrically to the axis of rotation of the operating workpiece spindle of the automatic lathe, has, up to now, been advanced each time following the machining or rather production of a workpiece either by means of an advancing apparatus associated with the automatic lathe or by means of a stock bar slide of the bar loading magazine. Such an advancing apparatus is located between the bar loading magazine and the workpiece clamping location of the workpiece spindle of the automatic lathe, wherein this clamping location is arranged at the front end of the workpiece spindle facing the working area of the automatic lathe and is customarily designed as a so-called clamping chuck. The advancing apparatus is normally an advancing claw similar to a chuck which is arranged in the workpiece spindle behind the workpiece chuck of this spindle. On the other hand, the stock bar slide of a bar loading magazine is an advancing element which abuts against the rear end of the stock bar which is just being machined and is still guided in the bar loading magazine and pushes this bar forwards in the direction towards the workpiece spindle of the automatic lathe. In both cases, the stock bar is, of course, always advanced when the chuck of the workpiece spindle of the automatic lathe is open.

In connection with an automatically operating bar loading magazine the feeding apparatuses first mentioned result in certain advantages in comparison with stock bar slides: The construction of the stock bar magazine becomes simpler because the stock bar slide with its drive can be omitted, the constructional length of the stock bar magazine becomes smaller, and it is easier to adapt the diameter of the guide means of the bar loading magazine guiding the stock bar just being machined to stock bars of different diameters because no stock bar slide is present.

The present invention relates exclusively to stock bar feeding apparatuses for such machine tools which have their own stock bar advancing apparatus available or with which a stock bar advancing apparatus arranged between the actual machine tool and the actual bar loading magazine is associated.

DE-PS 1 777 170 describes a bar loading magazine which is combined with a single spindle lathe, in the workpiece spindle of which an advancing apparatus with an advancing claw is arranged behind the chuck holding a workpiece to be machined. The bar loading magazine has a guiding and receiving box arranged on a frame for receiving and guiding a new stock bar which is to be fed to the lathe and this box is formed by an upper and a lower receiving channel respectively shaped like half shells in cross section. These channels leave a longitudinal slot free between them which is penetrated by a pushing-in entrainer which is secured to a drive chain extending, like the receiving box, in the direction of the axis of rotation of the workpiece spindle and can be placed against the rear end of a new stock bar to be fed to the lathe in order to press this through the advancing claw of the workpiece spindle—such advancing claws are customarily spring claws which are not tensioned and opened but abut against the stock bar only due to their spring action. The upper receiving channel of the receiving box is borne by a pivotable lever in order to be able to open a guide passage of the receiving box formed by the two receiving channels and allow a new stock bar to roll out of a slide bearing a supply of stock bars into the lower receiving channel.

As is customary in lathes combined with a bar loading magazine, a new stock bar is advanced by the pushing-in entrainer through the advancing claw and the open workpiece chuck of the workpiece spindle to such an extent that it projects somewhat beyond the front end of the workpiece spindle and reaches the area of a lathe tool designed as a so-called cut-off chisel, with which the front, rough end of the new stock bar is faced once the chuck of the workpiece spindle has been clamped and the latter caused to rotate together with a new stock bar.

This known construction has various disadvantages: Since the two receiving channels form between them an open longitudinal slot for the passage of the pushing-in entrainer, the stability of the guide passage is impaired by this longitudinal slot; moreover, in the case of a bar loading magazine with a guide passage flooded with oil, the slot interrupts the hydrodynamic lubricating and guiding or rather centering effect. The machining of stock bars which were, originally, already of unequal lengths requires a measuring device (also called a push-in control) which sees to it that when a new stock bar is inserted into the workpiece spindle of the lathe the stock bar reaches as far as the cut-off chisel of the lathe so that the front end of the bar can be faced; for this purpose, a stop is provided, which is moved in between bar loading magazine and workpiece spindle of the lathe and moved forward against the front end of the new stock bar, as well as, in addition, a control chain which can be switched in via a magnetic coupling and predetermines the push-in path of the new stock bar as far as the cut-off chisel once the stop has been withdrawn. Since the push-in force which is necessary to press the new stock bar through the advancing claw of the workpiece spindle is considerable, and since it is, in addition, not allowable for the new stock bar to travel against the movable stop with such a high feeding force, an adjustable slipping clutch must be provided in the drive of the pushing-in entrainer. Since a new stock bar to be fed to the lathe is, from the beginning, pushed from behind by the pushing-in entrainer, the receiving box formed by the two receiving channels must have the length of the longest stock bar to be machined in order to prevent any buckling of the stock bar under the influence of the push-in force (as soon as a new stock bar has been pushed into the workpiece spindle of the lathe, a guide passage shorter by the length of the workpiece spindle and, therefore, a receiving box shorter by this length would, on the other hand, be adequate).

The object underlying the invention was to create for a machine tool, in particular an automatic lathe, which has its own advancing apparatus available for the section-wise advancing of a stock bar to be machined in the machine tool or which has such an advancing apparatus associated with it, a stock bar feeding apparatus which does not have the disadvantages connected with the insertion of a new stock bar into the machine tool by means of a pushing-in element to be placed against the rear end of the stock bar.

BRIEF SUMMARY OF THE INVENTION

The invention proceeds on the basis of an automatic apparatus for the feeding of bar-shaped stock in longitudinal direction of a stock bar to a machining station of a machine tool, in particular an automatic lathe, which comprises an elongated receiving and guiding box supported by a frame and extending in feed direction, the box having a receiving and guiding passage for receiving a new stock bar as well as for guiding the same in feed direction during the sectionwise working of the stock bar by the machine tool, this passage likewise extending in feed direction and being open at least at the end of the receiving box facing the machining station, and the box being formed by at least two receiving channels shell-shaped in cross section and thus being divided in its longitudinal direction, and which also comprises an actuating device for opening and closing the receiving box by moving at least one receiving channel transversely to the feed direction such that when the receiving box is open a new stock bar can be fed to it in a direction transverse to its longitudinal direction, as well as a pushing-in device for pushing a new stock bar into the machine tool in feed direction.

To accomplish the specified object, such an apparatus is designed according to the invention such that a clamping device which can be controllably closed and opened is associated with the receiving box for securing a new stock bar in place in the receiving box and the latter is guided on the frame for displacement in feed direction and can be displaced back and forth in feed direction by the pushing-in device.

Since, during use of the inventive stock bar feeding apparatus, the receiving box receiving a new stock bar is moved forwards, together with the clamping device holding this stock bar in position in the receiving box, in the direction towards the machine tool, the receiving channels can form a guide passage which is closed over its entire circumference so that the passage can be configured so as to be extremely stable and an uninterrupted film of oil can form between a stock bar and the inner wall of the guide passage. The stock bar rotating together with the workpiece spindle of a lathe after termination of the pushing-in procedure can glide on this film of oil and the stock bar is, where necessary, also centered exactly thereby. Since a new stock bar is inserted into the machine tool by the receiving box moving forwards together with the clamping device, it is only necessary to insert a new stock bar into the opened receiving box to such an extent that it projects beyond the latter sufficiently far forwards so that it can be introduced into an advancing apparatus associated with the machine tool. Since the clamping device can be arranged in the receiving box itself but even better at the front end of the receiving box, there is also no danger of a new stock bar buckling when the latter projects to the rear beyond the receiving box; the latter can therefore have shorter dimensions than in the known stock bar feeding apparatus described in the above. Even when the stock bars machined are not always of equal lengths, no push-in control similar to a measuring device is required since, as will be shown in the following, it is extremely easy to see to it that all the stock bars are pushed into the receiving box with their front ends positioned identically in relation to the receiving box and thus project to the same extent beyond the front end of the receiving box irrespective of their overall length.

The receiving box in the inventive stock bar feeding apparatus need not, of course, be formed by only two receiving channels, as is the case in the apparatus according to DE-PS 1 777 170 it is only necessary for one of, for example, a total of three receiving channels of the guide passage of the receiving box to be exposed by upward pivoting, lifting or the like to such an extent that a new stock bar can be introduced from above or from the side into this guide passage and it is, consequently, not necessary to push the new stock bar into the guide passage from the rear.

So that stock bars having different diameters, where applicable also with different cross-sectional shapes (when the stock bar does not rotate during working), can be held exactly centered and guided in the receiving box without another respective receiving box being required for this purpose, an advantageous embodiment of the inventive stock bar feeding apparatus is designed such that the diameter of the passage of the receiving box corresponds at least to the largest stock bar diameter which can be machined on the machine tool and that the passage is equipped with holding devices for interchangeable reducing bushing elements which can be inserted into the receiving channels and are likewise channel-shaped, wherein each set of reducing bushing elements defines an internal diameter corresponding to the diameter of the stock bar to be machined. The reducing bushing elements are easy to produce, can be adapted exactly to the diameter or rather the cross-sectional shape of the stock bar to be machined and are quick and easy to exchange.

It would, in principle, be conceivable for the receiving box to be moved along displacement paths of different lengths, depending on of the length of the stock bar, for pushing a new stock bar into a machine tool; since it is, however, as will be shown in the following, quite possible to always push new stock bars into the receiving box such that their part projecting forwards beyond the receiving box is always of the same length, the construction can be kept simple by the receiving box being displaceable between a stationary front end position facing the machine tool and a stationary rear end position, in which a new stock bar is introduced into the receiving box.

When the stock bar is surrounded in the guide passage by a film of oil, high hydrodynamic pressures result in the guide passage at the high rotational speeds of the stock bar clamped in the workpiece spindle of the lathe and these pressures are certainly desired for the centering of the stock bar but attempt to press the receiving channels apart from one another and, consequently, to open the guide passage and so this has to be counteracted. It would be possible to think of designing the actuating device for the opening and closing of the guide passage such that it moves back and forth together with the receiving box during the reciprocating movement thereof and forms a device for holding the guide passage closed—this would be possible, for example, with a pressure-medium cylinder. Since the guide passage is intended to be loaded with a new stock bar in the rear end position of the receiving box and the guide passage has to be open for this, on the other hand, the latter must be closed in the front end position of the receiving box so that the stock bar is centered in the guide passage during working in the lathe, a design of the inventive feeding apparatus is recommended such that at least one locking element is associated with the receiving channels for keeping the receiving box closed and that the apparatus is provided with front and rear actuating elements for the locking element associated with the front and rear end positions of the receiving box such that the receiving channels are automatically locked against one another when the front end position is reached and automatically unlocked when the rear end position is reached, which simplifies the construction of the feeding apparatus itself and its control.

As has already been indicated, one of the receiving channels could be moved in some way or other transversely to the longitudinal direction of the passage for opening the guide passage; the construction does, however, become particularly simple when the receiving box is formed by two receiving channels which are designed in cross section, in particular, in the shape of half shells and which are articulatedly connected to one another at their first longitudinal sides via a hinge joint having a joint axis extending in longitudinal direction of the guide passage so that no special support element is required for the receiving channel which has to be moved for opening the guide passage and it is easier to keep the guide passage closed.

An automatic locking of the receiving channels against one another when the receiving box moves into its front end position as well as an automatic unlocking of the receiving channels when the receiving box moves into its rear end position can be accomplished in a simple manner and, at the same time, the construction be designed particularly simply when the receiving channels are provided at their longitudinal sides located opposite the hinge joint with a hinge frame-type locking device having an axis extending in longitudinal direction of the receiving box, when several rod-like locking elements arranged one after the other in longitudinal direction without spacing are provided, wherein each hinge frame element of the locking device has one locking element longitudinally displaceable therein associated with it, and when the actuating elements for the locking device are designed as stationary stops acting in longitudinal direction on the terminal locking elements such that the contact points of the locking elements are located between the hinge frame elements in the rear end position of the receiving box and within the hinge frame elements in the front end position.

As in the known feeding apparatus according to DE-PS 1 777 170, it is also advantageous in the inventive apparatus for this to have a stock bar magazine which can be arranged next to the receiving box and has an inclined slide sloping downwards in the direction towards the receiving box for supporting a plurality of stock bars arranged next to one another and oriented parallel to the feed direction, and, in addition, for a loading device for loading the stock bar respectively nearest to the receiving box from the slide into the opened guide passage to be provided since the means for loading the guide passage with a new stock bar can then be of a particularly simple design.

Since the new stock bars are located next to one another on the slide of the stock bar magazine without any gaps in between but only one stock bar may be loaded at any one time into the open guide passage, stock bar singling means must be provided in the region of the lower end of the slide. These and the means for loading a new stock bar into the open guide passage are particularly simple when a stock bar stop is provided which is associated with the lower longitudinal edge of the slide facing the receiving box and when, furthermore, at least one lifting element is provided for lifting the respectively nearest stock bar over this stop into the opened guide passage. This lifting element could, for example, be of a claw-like design and be moved close to the nearest stock bar from above; the construction does, however, become simpler when the lifting element has an inclined support surface sloping downwards in the direction towards the receiving box for the respectively nearest stock bar and this surface is located at the most at the level of the lower longitudinal edge of the slide in the lower inoperative position of the lifting element and in the upper end position of the lifting element at such a level that a stock bar located on this support surface rolls and/or slides by itself into the opened guide passage since, in this case, the lifting element need only carry out a linear lifting movement and not a transverse movement, as well, in order to allow the new stock bar to pass into the open guide passage.

Since, normally, stock bars originally having different lengths are machined but the control of the inventive stock bar feeding apparatus becomes particularly simple when a new stock bar always projects to the same extent beyond the front end of the receiving box until this stock bar is introduced into the machine tool, an embodiment of the inventive stock bar feeding apparatus is recommended, in which the front edge of the slide in feed direction, which forms, in particular, a stop for the front stock bar ends, is spaced from the front end of the receiving box located in its rear end position by a distance, measured in feed direction, which corresponds to the length of the stock bar projecting beyond the front end of the receiving box, this projecting length being necessary for inserting a new stock bar into the machining station of the machine tool by advancing the receiving box into its front end position. In this case, it is guaranteed, also for stock bars originally having different lengths, that by displacing the receiving box from its rear end position, in which it has been loaded with a new stock bar, into its front end position the front end of the new stock bar is introduced into the advancing apparatus associated with the machine tool, which has to see to it that the stock bar is advanced workpiece by workpiece while it is being worked.

Since the clamping device travelling back and forth with the receiving box merely has to see to it that a new stock bar which is located in the guide passage reaches the said advancing apparatus when the receiving box is moved forwards, the clamping device could be arranged anywhere in the region of the guide passage, directly behind it or in front of the front end of the guide passage. However, to ensure that stock bars which do not project rearwards beyond the receiving box can also be machined as well as to attain as simple a construction as possible, it is, however, recommendable to arrange the clamping device in front of the receiving box, namely, in particular, directly in front of the front end of the guide passage.

As will be seen in the following, a particularly simple construction results in embodiments having receiving channels articulated to one another via a hinge joint when the clamping device is designed as a clamping claw having two claw arms articulatedly connected to one another, although the clamping device could, of course, also have the shape of a customary, bushing-type chuck or, e.g., be formed by two transversely movable clamping jaws.

It is also pointed out, as a precaution, that the clamping device is displaceable back and forth over the entire path of displacement together with the receiving box only in preferred embodiments as the clamping device is, in principle, required only for that displacement of the receiving box, which results in the new stock bar being pushed into the specified advancing apparatus.

In particularly advantageous embodiments of the inventive stock bar feeding apparatus, the joint axis of the claw arms of the clamping claw pivotable about this axis is aligned with the joint axis of the hinge joint connecting the receiving channels as, in this case, it is particularly easy not only to open and close the receiving box but also actuate the clamping claw with one and the same actuating device, although it is of advantage, when using a different clamping device, for this to be actuatable by the actuating device for the opening and closing of the receiving box. It is also recommendable, for the said preferred embodiments, for these to be designed such that a link rod of the hinge joint of the receiving channels supports the clamping claw and forms its joint axis as, in this case, no special holding means are required for the clamping claw. Since, as already mentioned, the clamping device need be brought into action only when the receiving box pushes the front end of a new stock bar into the advancing apparatus, it is recommendable, for embodiments having a clamping claw as clamping device which is actuated by the device for the opening and closing of the receiving box, to couple each of the claw arms of the clamping claw with a respective one of the receiving channels via a mechanical coupling device having clearance in both pivot directions. This is, namely, the simplest way of ensuring that in the rear end position of the receiving box not only is its guide passage sealingly closed but also the clamping claw firmly grips the new stock bar and that after the front end of the new stock bar has been inserted into the advancing apparatus the latter moves the stock bar forwards in sections and the stock bar can rotate in the guide passage, for which purpose the clamping claw must release the stock bar, without the guide passage being opened since the latter is intended to guide and center the stock bar while it is being worked. The simplest way of ensuring these functions is to have the actuating device engage on the clamping claw for the opening and closing of the guide passage. In this case, the simplest construction results when the actuating device is supported by the clamping claw because then no special holding means are required for the actuating device and also no movement transfer means between actuating device and clamping claw. With a view to attaining as simple a construction as possible, it is recommended, in this case, that the actuating device be designed as a pressure-medium cylinder, the piston rod of which is articulatedly connected with the one claw arm and its cylinder with the other claw arm.

The basic concept of the present invention can not only be applied to machine tools having only one single machining station, i.e., in particular, single spindle automatic lathes, but the invention is also suitable for a multiple spindle automatic lathe which has a main spindle drum rotatable about a central indexing axis and bearing a plurality of workpiece spindles parallel to the indexing axis, the drum being adjustable by rotation about the indexing axis into a number of indexing positions corresponding to the number of workpiece spindles (multiple spindle automatic lathes of this type which are suitable for combining with the inventive feeding apparatus are disclosed, for example, in DE-PS 38 44 337 or U.S. Pat. No. 5,062,330). In such a case, only one stock bar carrier which forms the aforementioned frame and is rotatable about the indexing axis together with the workpiece spindles has to be provided and this carrier bears for each workpiece spindle a receiving box with a passage which is aligned with the workpiece spindle associated with it. In this respect, the construction becomes particularly simple when no special stock bar carrier is provided but rather the main spindle drum forms the stock bar carrier and bears the receiving boxes.

The application of the present invention to a multiple spindle automatic lathe also does not make it necessary to multiply one, several or all the active elements of the inventive stock bar feeding apparatus, i.e., for example, to provide them sixfold in an automatic lathe having six workpiece spindles.

In a preferred embodiment for a multiple spindle automatic lathe, only one single actuating device separate from the stock bar carrier is provided for the opening and closing of all the receiving boxes and is associated with a first receiving box position which corresponds to one of the indexing positions of the main spindle drum or rather of the stock bar carrier.

In the same way, it is recommended that only one single stock bar magazine separate from the stock bar carrier be provided and associated with the first receiving box position.

It is also advantageous to provide only one single clamping device separate from the stock bar carrier and associate this with a receiving box position which corresponds to one of the indexing positions. In order to keep the idle periods of the automatic lathe, during which no machining takes place, as small as possible in such a case, the clamping device of particularly advantageous embodiments is associated with the (second) receiving box position following the aforementioned first receiving box position in indexing direction of the main spindle drum although the clamping device Could, in principle, also be associated with the next receiving box position but one, etc..

In constructions having only one single clamping device, it is, in addition, of advantage for only one single pushing-in device, which is separate from the stock bar carrier and can be coupled with each of the receiving boxes one after the other in the direction of the indexing axis, to be provided, this pushing-in device being associated with the receiving box position associated with the clamping device.

In this respect, the construction becomes particularly simple when all the active elements of the inventive stock bar feeding apparatus which are only present once are arranged outside the paths of movement of the parts rotatable about the indexing axis with the stock bar carrier or rather can be moved such that they are located outside these paths of movement and cannot hinder any indexing of the stock bar carrier or rather the main spindle drum.

Additional advantageous features of the inventive stock bar feeding apparatus which can be used in conjunction with a multiple spindle automatic lathe can be derived from the attached claims 31–37.

BRIEF DESCRIPTION OF THE DRAWINGS

Additional features, advantages and details of the invention result from the following description as well as the attached drawings of two embodiments of the inventive stock bar feeding apparatus, one being provided for a single spindle automatic lathe and the other for a multiple spindle automatic lathe; in the drawings.

DESCRIPTION OF THE PREFERRED EMBODIMENTS

Figure 1:
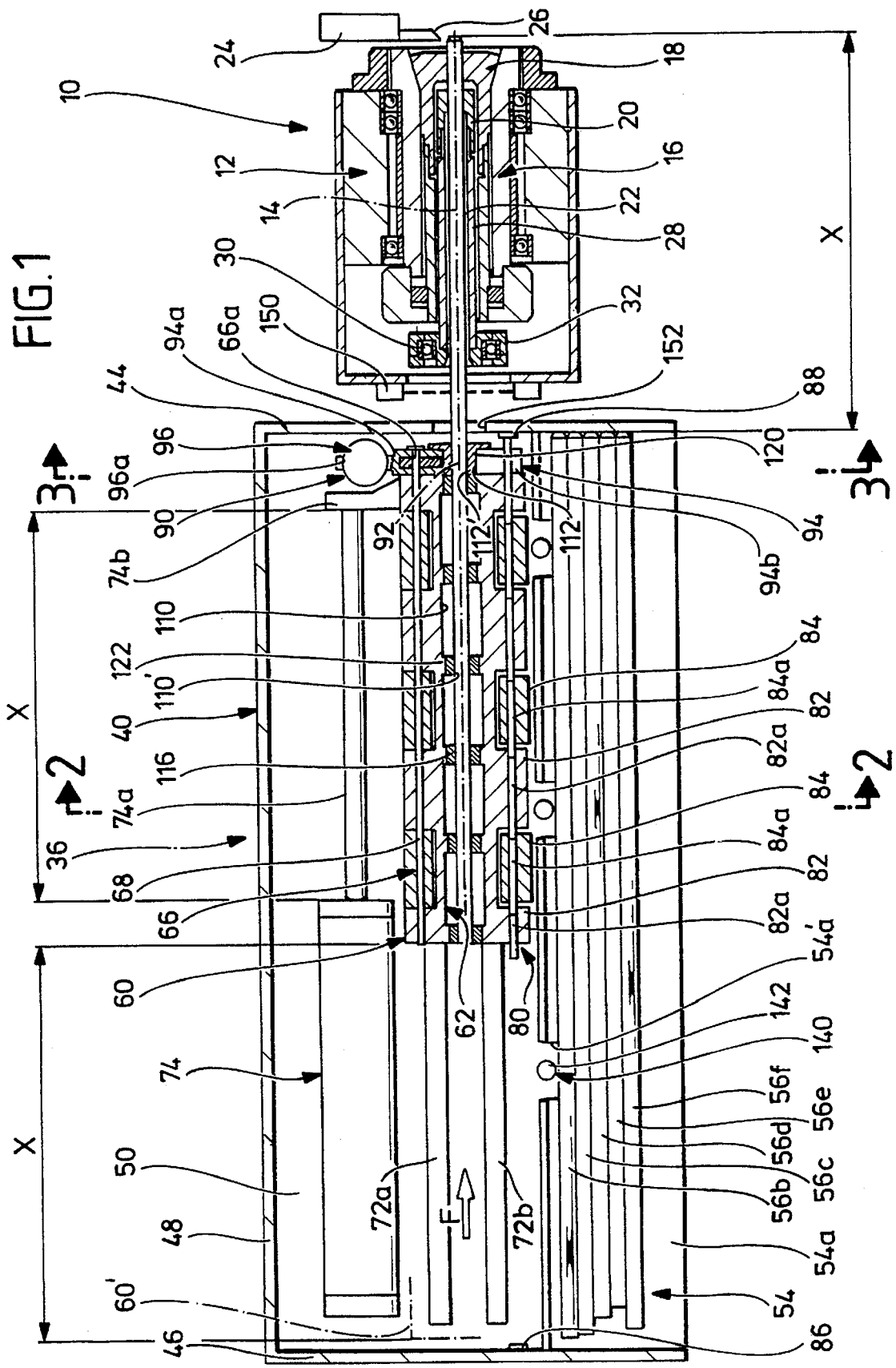
FIG. 1 shows the first embodiment of the stock bar feeding apparatus together with parts of a single spindle automatic lathe, with which the feeding apparatus is combined, namely partially in a plan view and partially in a section corresponding to line 1—1 in FIG. 2.

FIG. 1 shows parts of a single spindle automatic lathe 10, namely, inter alia, a headstock 12 of this automatic lathe, in which a workpiece spindle 16 rotatable about an axis of rotation 14 and axially non-displaceable is mounted. The workpiece spindle may be caused to rotate by means which are not illustrated, is designed as a hollow shaft, provided at its front end with a conventional workpiece chuck 18 and accommodates a likewise conventional advancing claw 20 which may be expanded contrary to its own spring action and abuts under this spring action against the circumference of a new stock bar 22 which has just been pushed into the automatic lathe 10 in the state illustrated in FIG. 1 and can thus move this bar forwards (to the right according to FIG. 1) in the direction of the axis of rotation 14. The advancing claw 20 therefore forms part of the aforementioned advancing apparatus and can be moved back and forth in the direction of the axis of rotation 14 by drive means which are only partially illustrated in FIG. 1 but are conventional. Actuating means which are likewise not illustrated but are conventional are provided for the radial opening and closing of the chuck 18 so that the advancing claw 20 can move the stock bar 22 forwards in sections when the chuck 18 is open whereas the chuck 18 holds the stock bar firmly when the advancing claw 20 is withdrawn, i.e. is moved to the left according to FIG. 1 and therefore slides over the circumference of the stock bar.

The automatic lathe 10 also has a tool carriage 24 in front of the workpiece spindle 16, i.e. in the working area of the lathe. This carriage is displaceable at least transversely to the axis of rotation 14 and bears a lathe tool 26 which is intended to be a so-called cut-off chisel, with the aid of which, on the one hand, the rough front end of a stock bar newly inserted into the automatic lathe can be faced and with which, on the other hand and if necessary, a workpiece machine-finished by the automatic lathe can be cut off, i.e. separated from the stock bar (always, of course, with a rotating workpiece spindle 16 and a stock bar 22 clamped therein with the aid of the chuck 18 and therefore rotating with the workpiece spindle).

Of the drive means for the advancing claw 20, FIG. 1 shows an advancing pipe 28, which is concentric to the axis of rotation 14, to which the advancing claw is attached and which rotates together with the workpiece spindle 16 when this is driven, in addition a ball bearing 30 holding the rear end of the advancing pipe 28 and an advancing ring 32 which encloses and holds the ball bearing and which can, for example, be moved back and forth by means of a pressure-medium cylinder in the direction of the axis of rotation 14.

The automatic lathe 10 and, in particular, its parts described in the above are of a conventional design and known to the person skilled in the art and so it is not necessary to describe these parts in greater detail or illustrate them in the drawings.

The first embodiment of the inventive stock bar feeding apparatus which cooperates with the automatic lathe 10 is designated in FIG. 1 as a whole as 36. As shown by FIG. 1 in conjunction with FIG. 2, the feeding apparatus 36 comprises a tub-like carrier 40 which forms the frame within the meaning of the preceding definition of the invention and the attached claims and so it will be designated in the following as frame 40; in the first embodiment according to FIGS. 1–3, the latter is arranged on a supporting frame 42.

For the following, the feed direction (cf. arrow "F" in FIG. 1) is intended to be defined as that direction which coincides with the direction of the axis of rotation 14 and points to the right according to FIG. 1.

Within the meaning of this definition, the tub-like frame 40 has a front end wall 44, a rear end wall (or rear wall) 46 and a rear longitudinal side wall 48, wherein for the operation of this embodiment it is, where necessary, only important for the inner surface of the front end wall 44 facing away from the automatic lathe 10 to extend vertically to the axis of rotation 14. A floor of the tub-like frame 40 has been designated as 50 (cf. also FIG. 2), and a front longitudinal side wall, which can be seen only in FIG. 2, as 52. A storage surface for new stock bars 56a, 56b, 56c, 56d etc. designed as a slide 54 is secured to this longitudinal side wall. The stock bars have been illustrated in the attached drawings with a circular cross section although, in principle, stock bars having different cross-sectional shapes can also be machined in a lathe, even if this is relatively uncommon. When the slide 54 (as in the embodiment illustrated in FIG. 2) has, apart from an inclined base 54a forming the actual storage surface for the stock bars, a front end wall 54b facing the automatic lathe 10, as well (which is not the case in the variation illustrated in FIG. 1), the end wall 54b can undertake the function to be described in the following as a stop for the front ends of the stock bars, whereby it is then necessary for the inner surface of the end wall 54b facing away from the automatic lathe 10 to extend vertically to the axis of rotation 14—in this case, the front end wall 44 of the tub-like frame 40 can be omitted or be inclined in any optional manner relative to the axis of rotation 14.

A receiving box 60 is guided for displacement on the floor 50 of the frame 40 in the direction of the axis of rotation 14 or rather parallel to the feed direction F. It consists essentially of two receiving channels shaped in cross section like half shells, namely a lower receiving channel 62 and an upper receiving channel 64 which are articulatedly connected with one another via a hinge joint 66, the pivot axis of which has been designated as 68. The lower receiving channel 62 is provided with a foot 70 which is approximately T-shaped in cross section and which slides along the floor 50 and is guided by means of longitudinal guide rails 72a and 72b, which are approximately L-shaped in cross section and secured to the floor 50, for longitudinal displacement on the frame 40 in the direction of the axis of rotation 14 or rather the feed direction F. In addition, a pushing-in cylinder 74 designed as a hydraulic cylinder is secured to the frame floor 50, and with a cylinder axis parallel to the axis of rotation 14 or rather the feed direction F, an arm 74b connected to the foot 70 being secured to its piston rod 74a. With the aid of the pushing-in cylinder 74, the receiving box 60 can be moved back and forth in the direction of the axis of rotation 14, namely between a front end position illustrated in FIG. 1 and a rear end position indicated in FIG. 1 at 60' with dash-dot lines.

At their longitudinal sides opposite the hinge joint 66, the two receiving channels 62 and 64 are provided with a hinge frame-type locking device 80 which is formed by bushing-like hinge elements 82 and 84 arranged one behind the other in longitudinal direction and alternatingly attached to the lower and upper receiving channels 62 and 64, respectively, as well as by locking rods 82a and 84a arranged one behind the other without spacing, wherein the locking rods 82a are associated with the hinge elements 82 and the locking rods 84a with the hinge elements 84. It is advantageous for a small space to be located each time between successive hinge elements 82 and 84 in longitudinal direction because the unlocking of the locking device 80 does not then require the locking rods to be positioned very exactly in longitudinal direction relative to the receiving box 80—this will become clear in detail from the following. Apart from the foremost locking bar 82a which is of a longer design, the length of each of the locking bars 82a, 84a corresponds to the length of the associated hinge elements 82, 84. In the position of the locking rods 82a, 84a illustrated in FIG. 1, the locking device 80 is locked, i.e. the receiving channels 62 and 64 are locked against one another and the receiving box 60 is secured against opening. If the locking rods 82a, 84a are, however, displaced out of their positions shown in FIGS. 1 to such an extent to the right that their contact points are located between the hinge elements 82 and 84, the upper receiving channel 64 can be pivoted upwards about the hinge axis 68.

A rear stop 86 is rigidly attached to the rear end wall 46 of the tub-like frame 40, a front stop 88 to the front end wall 44, namely each in such a position that the rear locking bar 82a runs into the stop 86 when the receiving box 60 moves into its rear end position and the front locking bar 82a runs into the front stop 88 when the receiving box 60 moves into its front end position, wherein the front and the rear locking rods are each of such a length or rather the stops 86 and 88 are positioned in the direction of the axis of rotation 14 such that the locking device 80 is unlocked in the rear end position of the receiving box 60 and locked in the front end position of the receiving box (the latter as is apparent from FIG. 1).

The hinge joint 66 has a continuous link rod 66a which extends forwards beyond the receiving box 60 and bears a clamping device 90 with the protruding part. This will now be explained in more detail on the basis of FIG. 3.

The link rod 66a and, with it, the pivot axis 68 extend parallel to an axis 92 of the feeding apparatus 36 which is also indicated in FIG. 1, wherein the axis 92, when the feeding apparatus 36 is combined with the automatic lathe 10, is aligned with its axis of rotation 14. The clamping device 90 comprises a clamping claw 94 with an upper and a lower claw arm 94a and 94b, respectively, which are articulatedly connected to one another via the link rod 66a and, consequently, can be pivoted about the pivot axis 68. Furthermore, the clamping device 90 has a pressure-medium cylinder 96 which actuates the clamping claw 94 and is also borne by it, namely in that a cylinder housing 96a of the pressure-medium cylinder 96 is articulated to the upper claw arm 94a and a piston rod 96b of the pressure-medium cylinder to the lower claw arm 94b, wherein the joint axes of the points of articulation which are parallel to the axis 92 have been designated as 96a' and 96b', respectively. The receiving box 60 can, however, also be opened up with the pressure-medium cylinder 96: For this purpose, an upper and a lower coupling rod 100 and 102, respectively, are provided (cf. FIGS. 2 and 3), and these rods extend parallel to one another and parallel to the axis 92 of the feeding apparatus, are secured in position in the upper receiving channel 64 and the lower receiving channel 62, respectively, and engage with transverse clearance in grooves (these could also be axial openings) 104 and 106, respectively, in the two claw arms. The purpose of this transverse clearance will result from the following. The coupling rods also prevent the entire clamping device 90 from being rotatable about the link rod 66a.

Figure 2:
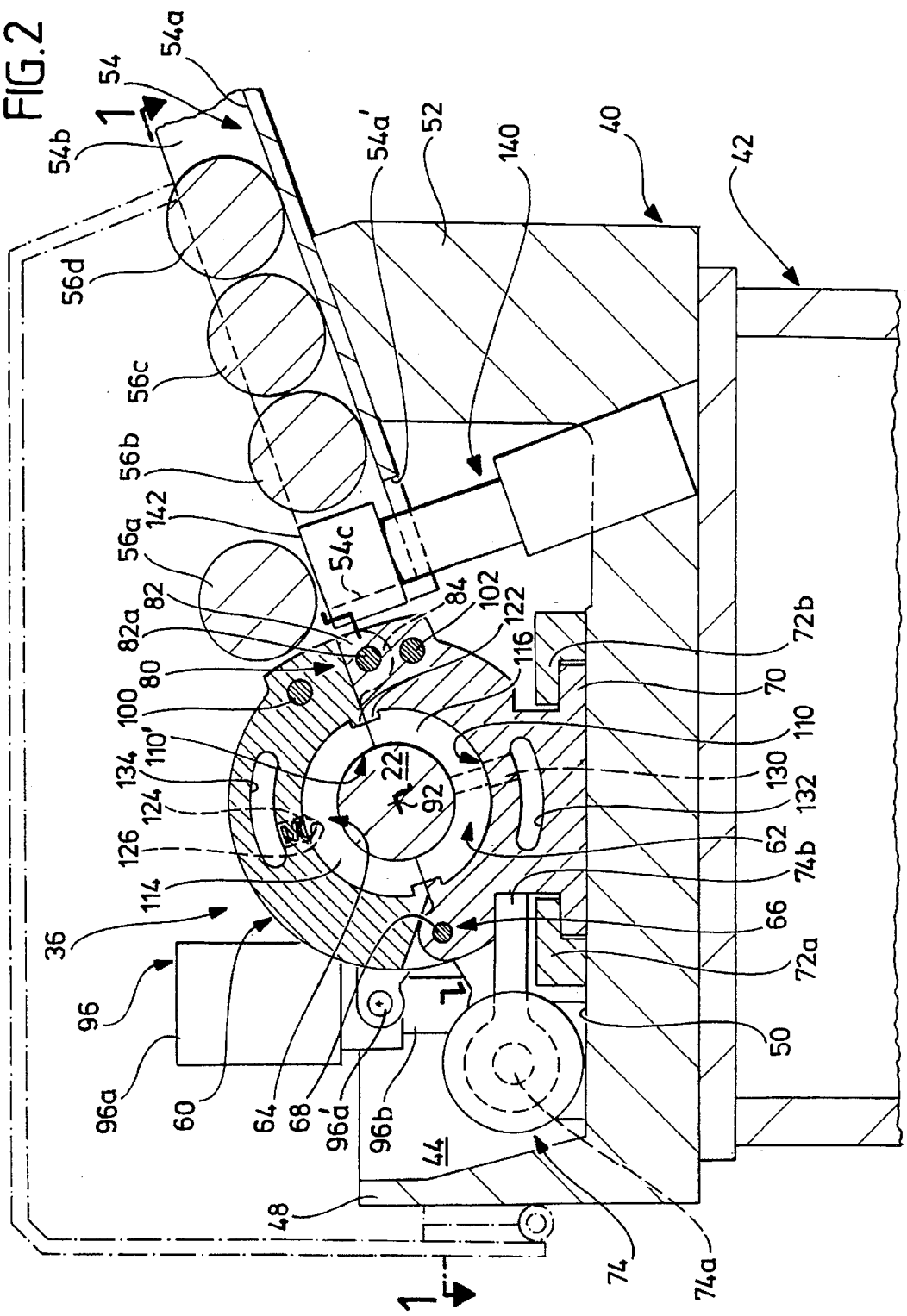
FIG. 2 shows a section through parts of this first embodiment of the stock bar feeding apparatus along line 2—2 in FIG. 1.

If only stock bars having the same diameter or rather the same cross-sectional form were always to be machined, it would be sufficient for the receiving box 60 to form with its two receiving channels 62, 64 a guide passage 110 which is open at front and back (for the machining of shorter stock bars, the guide passage could also be closed at the back) and for the two claw arms 94a, 94b to form a corresponding through opening 112. The illustrated embodiment of the inventive feeding apparatus is, however, designed such that it enables stock bars having different diameters to be machined and can be easily and inexpensively reequipped for a different stock bar diameter. For this purpose, exchangeable reducing bushing elements which are, in cross section, in the shape of a half shell are provided, namely a reducing bushing element 114 for the upper receiving channel 64, a reducing bushing element 116 for the lower receiving channel 62, a reducing bushing element 118 for the upper claw arm 94a and a reducing bushing element 120 for the lower claw arm 94b. The reducing bushing elements 114 and 116 are prevented from rotating by noses 122 integrally formed on the receiving channels 62 and 64 and projecting into the guide passage 110 and from displacement in axial direction by suitable securing elements. FIG. 2 shows such a securing element in the form of a biased detent ball 124 and a countersinking 126 whereas corresponding securing elements for the reducing bushing elements 118 and 120 of the clamping claw 94 have not been illustrated for the sake of simplicity (the reducing bushing elements could, for example, be held by means of screws screwed in from outside, for which threaded bores designed as blind holes can be provided in the reducing bushing elements).

In this way, the receiving box 60 can be provided with a guide passage 110' open to the front and back and having a selectable diameter, the clamping claw 94 with a through opening 112' having a likewise selectable diameter.

Each of the reducing bushing elements 114 and 116 as well as each of the receiving channels 64, 62 is provided with a bore 130 for lubricating oil (in FIG. 2, the bores 130 for lubricating oil aligned with one another have been illustrated only in the lower reducing bushing element 116 and in the lower receiving channel 62) in order to see to it that a film of lubricating oil is formed between a stock bar rotating in the guide passage 110' and the wall of the guide passage; for this purpose, the receiving channels 62 and 64 each have a passage for lubricating oil 132 and 134, respectively, which extends in longitudinal direction and into which the bores 130 for lubricating oil open. Lubricating oil exiting the guide passage 110' to the front and back can be collected by the tub formed by the frame 40 and returned to the passages 132, 134 for lubricating oil by suitable means.

As is apparent from FIGS. 1 and 2, several lifting cylinders 140 are arranged next to and along the path of the receiving box 60 on that side of the receiving box, on which the locking device 80 is provided. These cylinders are secured in the frame 40 and their piston rods can be extended vertically to the base 54a of the slide 54 and at the top form supporting surfaces 142 which are parallel to the base 54a, i.e. inclined accordingly. These surfaces are aligned with the upper side of the base 54a in the lower end position of the piston rods, which can engage through corresponding openings 54a' in the slide base 54a, and when the piston rods are extended can be brought to a level, at which they are at least aligned with the upper edge of the right-hand rim, according to FIG. 2, of the lower receiving channel 62. Moreover, the lifting cylinders 140 are arranged in accordance with the invention and their supporting surfaces 142 dimensioned such that only one stock bar is lifted each time with the supporting surfaces, namely that one of the stock bars stored on the slide 54 which is located respectively nearest to the receiving box 60, i.e. in FIG. 2 the stock bar 56a. Furthermore, during lifting of this stock bar the lifting cylinders 140 prevent the stock bars 56b, 56c etc. from rolling back with the aid of their piston rods.

Finally, FIG. 1 shows a light barrier 150 which is attached to the automatic lathe 10 in the illustrated embodiment but could also be placed at a different location between the feeding apparatus 36 and the workpiece spindle 16. FIG. 1 also shows a through opening 152 in the front end wall 44 of the frame 40, through which the stock bar 22 held by the receiving box 60 can be pushed.

The operation of the first embodiment will now be described in the following, wherein a control which is, in particular, common to the automatic lathe 10 and the feeding apparatus 36 has neither been illustrated nor described since such a control which can guarantee the operating sequence explained in the following can be realized by any person skilled in the field of controls without any inventive effort being necessary.

Once a stock bar previously worked in the automatic lathe 10 has left the feeding apparatus 36 (the receiving box 60 thereby takes up its front end position illustrated in FIG. 1) because it has been pushed ever further forwards or rather drawn forwards by the advancing claw 20 in sections in feed direction F, the light barrier 150 reports to the control that this stock bar has left the feeding apparatus 36 whereupon the control starts the loading procedure.

The pushing-in cylinder 74 first of all pulls the closed receiving box 60 which is still locked back into its rear end position (at 60'—cf. FIG. 1), whereby the locking rods 82a, 84a are displaced by the stop 86 to the right, i.e. towards the front, relative to the receiving box 60 when the receiving box moves into its rear end position which is to the left according to FIG. 1, and namely to such an extent that their contact points come to rest between the hinge elements 82 and 84 and thus the receiving box 60 is unlocked.

Figure 3:
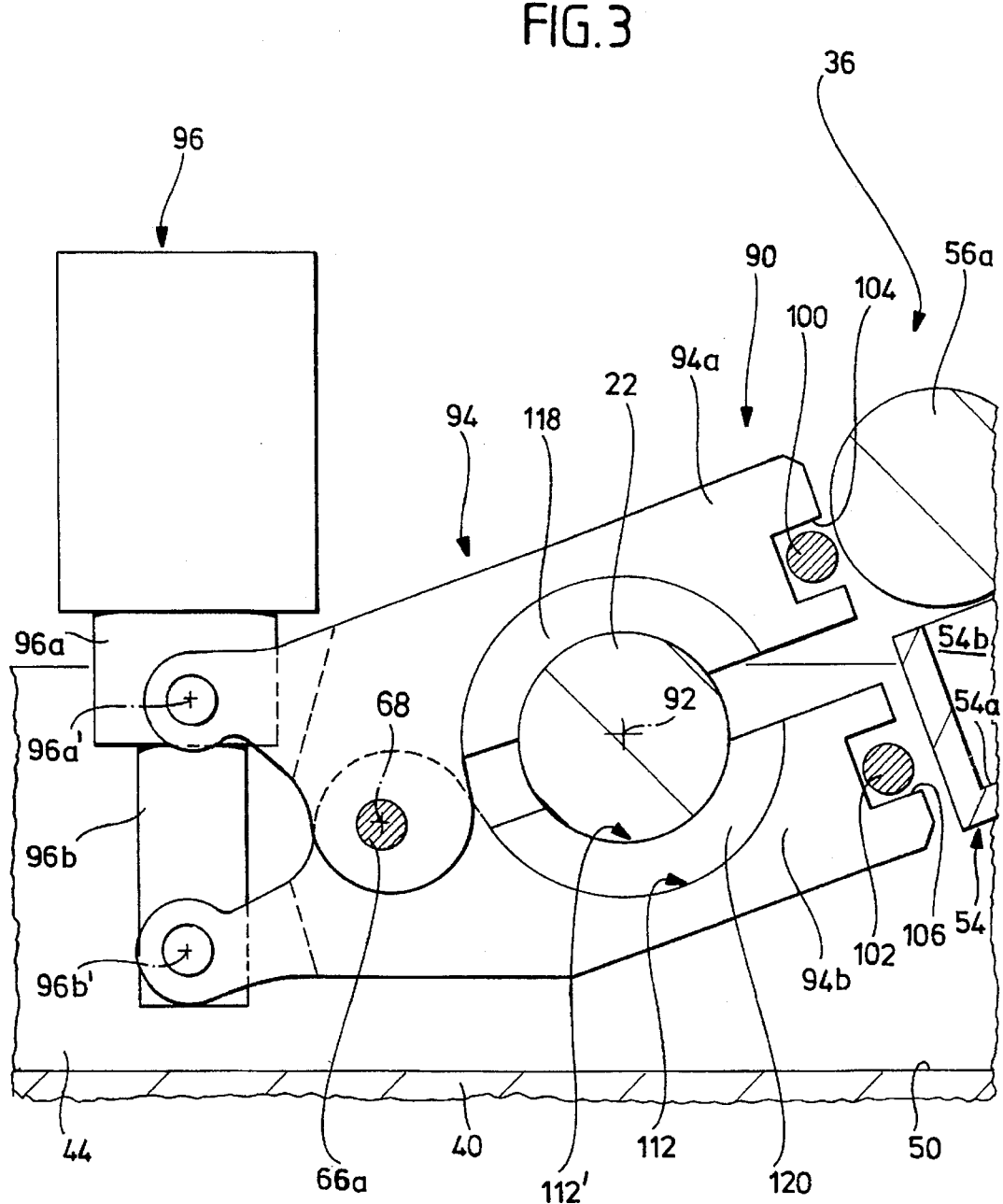
FIG. 3 shows a section through the clamping device of the first embodiment along line 3—3 in FIG. 1.

After that, the pressure-medium cylinder 96 pulls the piston rod 96b in (FIG. 3 shows the piston rod in an extended state), whereby the upper receiving channel 64 and the upper claw arm 94a are pivoted upwards (according to FIGS. 2 and 3 in the counterclockwise direction about the pivot axis 68) and thus the receiving box 60 or rather the guide passage 110' and the through opening 112' are opened.

It is assumed for the following that the slide 54 of the feeding apparatus 36 has been loaded with new stock bars 56a, 56b etc. such that the right ends, according to FIG. 1, of all the new stock bars abut against the front end wall 44 of the frame 40 or rather the front end wall 54b of the slide 54 and, consequently, different stock bar lengths become apparent only in the left region, according to FIG. 1, of the feeding apparatus 36.

Once the receiving box 60 located in its rear end position to the left according to FIG. 1 has been opened, the lifting cylinders 140 lift the foremost stock bar 56a to the extent shown in FIG. 2; it can then roll by itself into the opened guide passage 110' or rather into the opened through opening 112' of the clamping claw 94. Subsequently, the piston rods of the lifting cylinders 140 are again lowered, whereby the next stock bar 56b can, however, roll downwards on the slide 54 only to such an extent until it comes to rest against the left edge of the slide 54 according to FIG. 2, which forms a stop 54c, i.e. the slide 54 also forms a stop for the store of stock bars located on the slide 54.

After that, the control closes the receiving box 60 and the clamping claw 94 by extending the piston rod 96b of the pressure-medium cylinder 96 again. Thanks to the transverse clearance of the two coupling rods 100, 102 in the grooves 104, 106 of the clamping claw 94, it is ensured that not only will the guide passage 110' be sealingly closed but that the clamping claw 94 also firmly grips the new stock bar 56a.

In this state, the feeding apparatus 36 is ready to move the new stock bar 56a into the machining station of the machine tool, in the illustrated example into the workpiece spindle 16 of the automatic lathe 10. This takes place as soon as the rest of the stock bar previously worked, which is still located in the workpiece spindle 16, has been used up which can, for example, be reported to the control by the advancing claw 20; this procedure is known in machine tools combined with stock bar magazines and does not, therefore, need to be described further.

The control now stops the workpiece spindle 16 and opens its chuck 18. After that, the pushing-in cylinder 74 moves the receiving box 60 together with the closed clamping claw 94 in feed direction F so that the new stock bar 56a is pressed through the advancing claw 20 and pushed forward through the open chuck 18 to such an extent until its front right end, according to FIG. 1, reaches the area of the lathe tool 26; the new stock bar can thereby eject a stock bar rest, which is still located in the chuck, out of the workpiece spindle 16 to the right according to FIG. 1. Shortly before the receiving box 60 reaches the front end position, the locking rod 82a located at the right end of the receiving box strikes the stationary front stop 88 so that during the further course of displacement of the receiving box 60 to the right the locking bars 82a and 84a are all pushed to the left relative to the receiving box 60 and take up their positions illustrated in FIG. 1; this means that the receiving channels 62 and 64 are, again, positively locked against one another.

Finally, the control causes the pressure-medium cylinder 96 (which must, of course, be a double-acting cylinder) to open the clamping claw 94 somewhat so that it releases the new stock bar 56a; this is possible thanks to the transverse clearance of the coupling rods 100 and 102 in the grooves 104 and 106 without the guide passage 110 thereby being opened which would also not be possible at all in view of the previously activated locking device 80. Since the stock bar can now be freely rotated in the guide passage 110' and displaced in longitudinal direction, the automatic lathe 10 can begin with the working of the new stock bar. For this purpose, the chuck 18 is closed and, first of all, the front end of the new stock bar which is still rough is faced with the lathe tool 26 once the workpiece spindle 16 has been caused to rotate.

After that, the automatic lathe 10 operates in a conventional manner, whereby the stock bar is moved forwards to the right according to FIG. 1 in sections, i.e. workpiece by workpiece, with the aid of the advancing claw 20. Once this stock bar has been used up, the cycle described above starts anew.

So that a complete signal cycle results for the control, this can be configured such that the pressure-medium cylinder 96 fully extends its piston rod 96b again and closes the clamping claw 94 once it has been reported to the control by the light barrier 150 that the stock bar just being machined has left the feeding apparatus 36.

Figure 4:
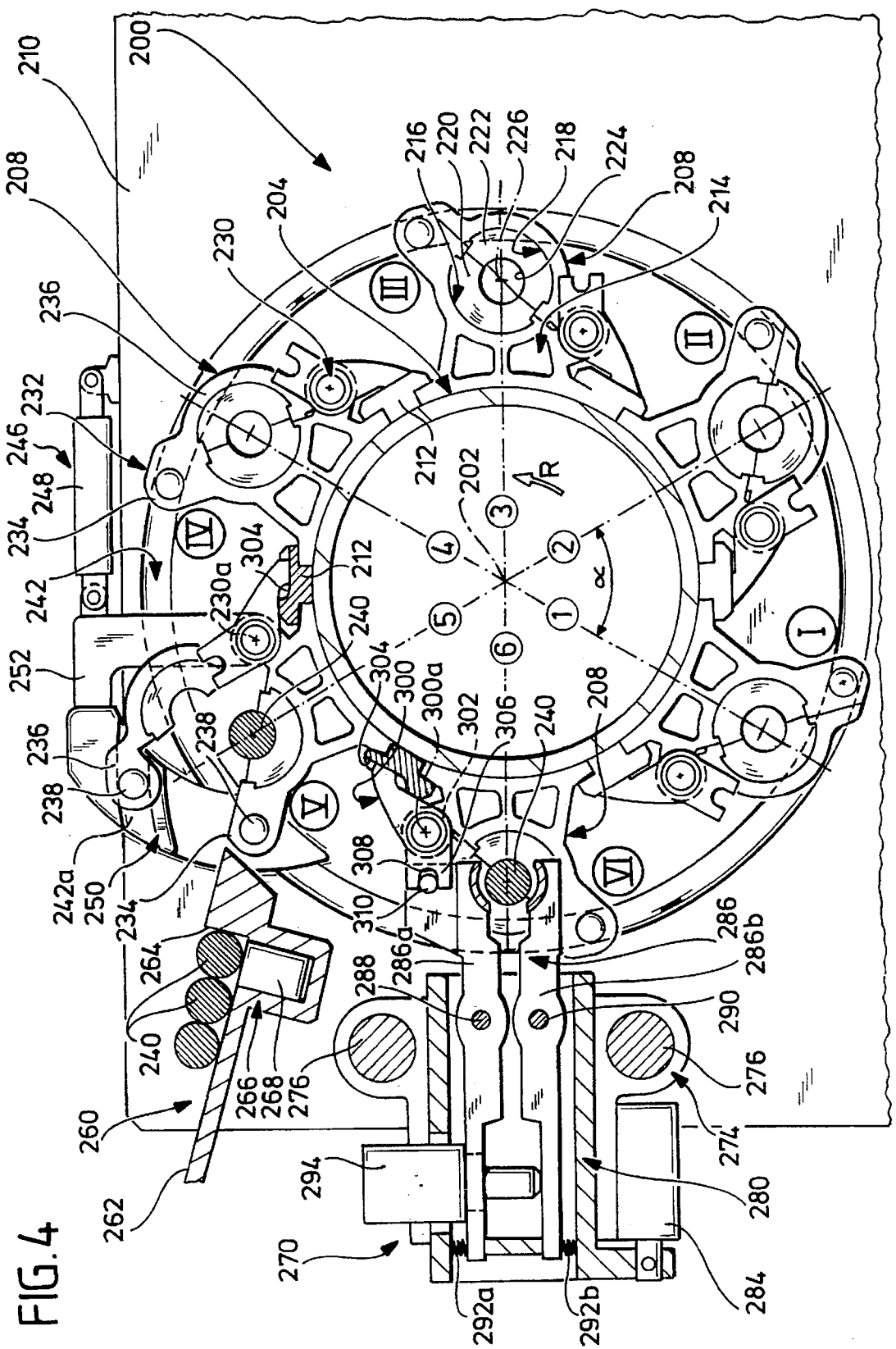
FIG. 4 shows a section through parts of a second embodiment of the inventive stock bar feeding apparatus which can cooperate with a multiple spindle automatic lathe, namely a section vertical to the indexing axis of the main spindle drum of this multiple spindle automatic lathe.
Figure 5:
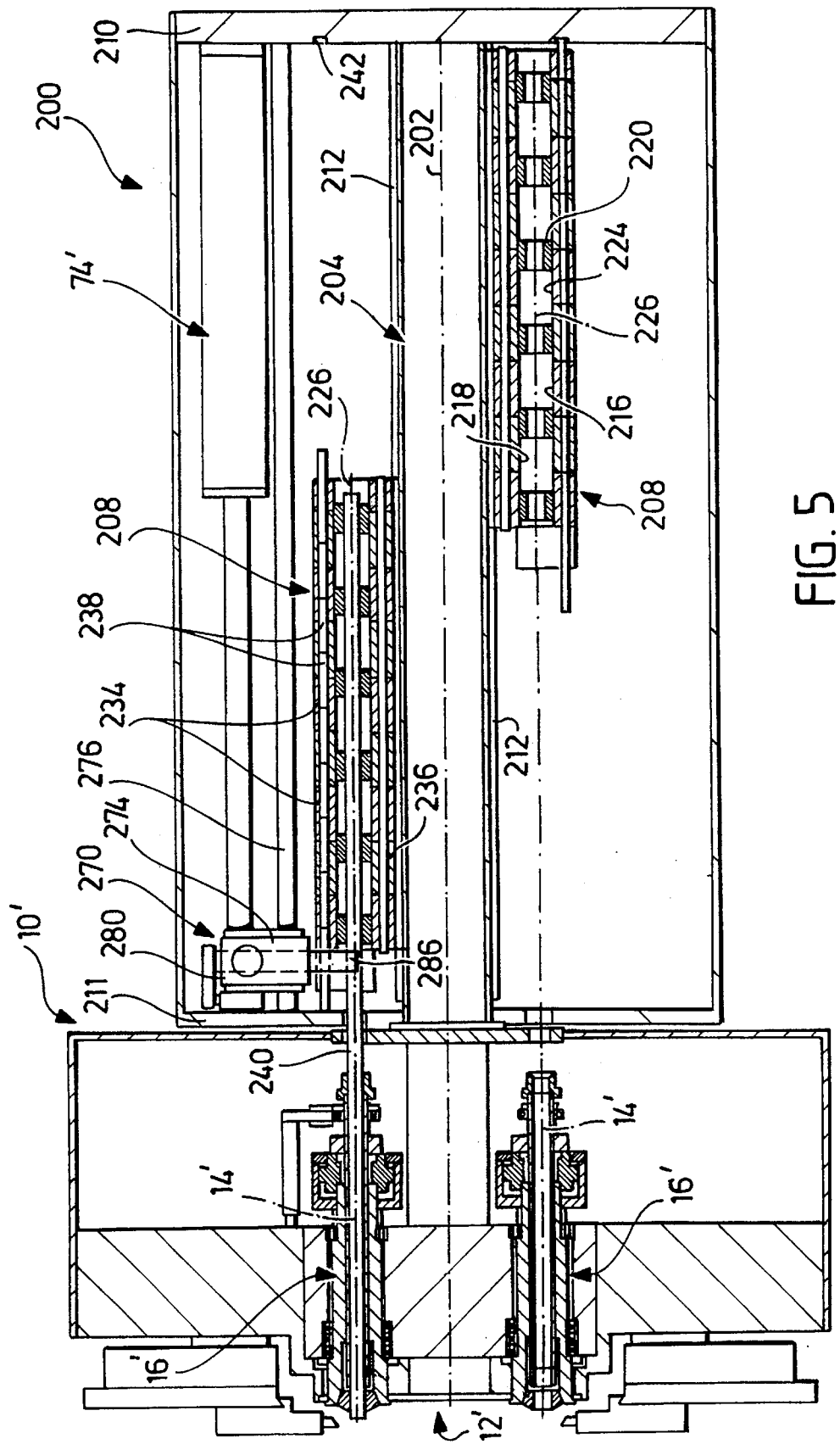
FIG. 5 is an illustration corresponding to FIG. 1 of the second embodiment together with parts of a multiple spindle automatic lathe combined with it.

The second embodiment of the inventive stock bar feeding apparatus provided for a multiple spindle automatic lathe is illustrated in FIGS. 4 and 5 and will be described in the following only to the extent that this is necessary for understanding the invention, i.e. for understanding those constructional changes and those changes to the operating sequence which are recommended for the case where the inventive stock bar feeding apparatus is combined with a multiple spindle automatic lathe.

FIG. 4 shows an inventive stock bar feeding apparatus with 6 stations each bearing a receiving box for use with a multiple spindle automatic lathe having 6 workpiece spindles. However, it is obvious that the inventive feeding apparatus can be realized with any optional number of stations, depending on the number of workpiece spindles of the automatic lathe, with which the feeding apparatus is intended to cooperate.

The sectional plane of the section illustrated in FIG. 4 through the stock bar feeding apparatus designated as a whole as 200 extends vertically to an indexing axis 202 which, during operation, is aligned with the indexing axis of the main spindle drum of the multiple spindle automatic lathe and about which a drum-like stock bar carrier can be rotated in phase with the rotary indexing movements of the main spindle drum of the automatic lathe, namely by drive means which are not illustrated and such that this stock bar carrier is indexed synchronously with and in identical angle of rotation steps to the main spindle drum. The drum-like stock bar carrier illustrated at 204 will be designated in the following as magazine drum.

The inventive stock bar feeding apparatus could, in principle, also be integrated into the multiple spindle automatic lathe, whereby its main spindle drum could then also form the stock bar carrier or rather the magazine drum. Since the main spindle drum of a modern multiple spindle automatic lathe must, however, have an extremely stable construction and is also relatively heavy due to the constructional units carried by it, the attempt to keep the mass which is to be rotationally indexed as small as possible will normally result in the stock bar feeding apparatus being designed as a special unit separated from the automatic lathe.

The magazine drum 204 has six stations I—VI, each of which is provided with a receiving box 208. These stations are arranged at an equal distance from one another with respect to their angles of rotation, i.e. with respectively identical angular distances α in circumferential direction of the magazine drum 204. The direction, in which the magazine drum 40–like the main spindle drum of the automatic lathe–is rotationally indexed, has been indicated by the arrow R. The angular positions which the various stations I-VI take up during the course of the indexing of the magazine drum 204 have been designated with the reference numerals 1–6.

The feeding apparatus 200 has a frame-type structure with two end walls arranged at a distance from one another in the direction of the indexing axis 202; the magazine drum 204 is mounted on these walls for rotation about the indexing axis 202 and of these walls only a part of a rear wall 210 is shown in FIG. 4, and this rear wall is intended to be the rear end wall of the frame-like structure facing away from the automatic lathe, while a front end wall 211 has also been illustrated in FIG. 5.

Six longitudinal guide rails 212 are secured to the outer circumference of the magazine drum 204, these rails extending parallel to the indexing axis 202 and having an approximately T-shaped cross section. Two of these longitudinal guide rails 212 serve each time as guide means for a foot 214 of a lower receiving channel 216 of the receiving box 208 of the relevant station, and this receiving box is completed by an upper receiving channel 218. The receiving boxes 208 are therefore positively held between two respective longitudinal guide rails 212 and between these guide rails and the circumference of the magazine drum 204 and are guided in the direction of the indexing axis 202, namely as in the first embodiment between a front end position, in which the relevant receiving box 208 is closest to the main spindle drum of the automatic lathe, and a rear end position, in which the relevant receiving box is closest to the rear wall 210. FIG. 4 also shows that the receiving boxes 208, like the receiving boxes 60 of the first embodiment, are provided with reducing bushing elements 220 and 222 so that each of the receiving boxes 208 has a guide passage 224 which extends in the direction of the indexing axis 202, is open to the front and back and adapted in its cross section to that of the stock bars to be machined. During operation, the axes 226 of the guide passages 224 are aligned with the axes of the workpiece spindles of the automatic lathe.

The description of the six identically designed receiving boxes 208 of the second embodiment can be kept short since these receiving boxes are, in principle, designed in exactly the same way as the receiving boxes 60 of the first embodiment. Each of the receiving boxes 208 has a hinge joint 230, via which upper and lower receiving channels 216 and 218, respectively, are articulatedly connected to one another, and the hinge axis extends parallel to the indexing axis 202. At their longitudinal sides located opposite the hinge joint 230, the receiving channels are provided with a locking device 232 of a hinge frame-type design, the hinge elements of which have been designated as 234 and 236. Locking rods are also guided for displacement in the bores of these hinge elements 234, 236 and these locking rods correspond to the locking rods 82a and 84a of the first embodiment and have all been provided in FIG. 4 with the reference numeral 238. Finally, the stock bars illustrated in FIG. 4 have all been designated with the reference numeral 240.

For the locking rods 238 respectively facing the rear wall 210, this rear wall forms a guide means and an axial stop in the form of a ring or guiding groove 242 which is concentric to the indexing axis 202 and is engaged by the rearmost locking rod 238 of a receiving box 208 taking up its rear end position. The base or bottom of the guiding groove 242 replaces the stop 86 of the first embodiment, and due to the guiding groove 242 a receiving box 208 taking up its rear end position, the locking device 232 of which is then unlocked, is prevented from swinging open when the magazine drum 204 is indexed. The front end wall 211 of the feeding apparatus 202 located opposite the rear wall 210 does not require such a guiding groove; on the contrary, it merely forms a stationary stop which corresponds to the stop 88 of the first embodiment and due to which the locking device 232 of a receiving box 208 is locked when the latter moves into its front end position—for this purpose, it is, of course necessary for each set of locking rods 238 to project in the same manner forwards beyond the receiving box 208 associated with it when the locking device 232 is released, as is the case in the first embodiment according to FIGS. 1–3.

The feeding apparatus 200 has for all the receiving boxes 208 only one single actuating device 246 for the opening and closing of the receiving boxes or rather of the guide passages 224. This actuating device 246 is permanently associated with position 5 and it comprises a pressure-medium cylinder 248, a guide segment 250 and a pivot lever 252. The pressure-medium cylinder 248 which, as usual, consists of a cylinder housing and a piston rod is articulated, on the one hand, to the rear wall 210 and, on the other hand, to the pivot lever 252, whereby the joint axes extend parallel to the indexing axis 202. The pivot lever 252 is likewise articulated to the rear wall 210 and thus pivotable about an axis which is aligned with the pivot axis 230a of the hinge joint 230 of a receiving box 208 located in position 5. The guide segment 250 secured to the pivot lever 252 includes a part 242a of the guiding groove 242, and the actuating device 246 is designed such that when the piston rod of the pressure-medium cylinder 248 is drawn in the parts of the actuating device take up the position illustrated in FIG. 4 whereas the pivot lever 252 together with guide segment 250 can be pivoted in the counterclockwise direction about the pivot axis 230a when the piston rod of the pressure-medium cylinder 248 is extended, such that the guiding groove part 242a completes the guiding groove 242 to form an annular groove.

When a receiving box 208 is moved into its rear end position so that its rearmost locking rod 238 runs into the guiding groove 242 and the locking device 232 of this receiving box 208 is unlocked in this way, and once this receiving box 208 has been brought into position 5, this receiving box can be swung open with the aid of the actuating device 246 so that it is in the state illustrated in FIG. 4. In this connection, it is to be noted that a receiving box 208 indexed into position 5 does not contain any stock bar 240 but will rather be loaded with a new stock bar once the receiving box in position 5 has been swung open.

For this purpose, a stock bar magazine 260 is associated with position 5 and this magazine is secured, for example, to the rear wall 210 and to the front end wall of the feeding apparatus 200 located opposite this rear wall. The magazine 260 has a slide 262 as storage surface for a set of new stock bars 240, wherein the upper side of the slide 262 is arranged at such a level and inclined to the right according to FIG. 4 such that these stock bars, the longitudinal axes of which extend parallel to the indexing axis 202, have the tendency to roll down the slide in the direction towards the receiving box 208 located in position 5. At the front, right end, according to FIG. 4, of the slide 262 the magazine 260 has a stop 264 for the respectively foremost stock bar 240, beneath which the magazine is provided with a set of lifting cylinders 266 which are arranged in spaced relation to one another and one behind the other in the direction of the indexing axis 202. The new stock bars 240 can be separated by the pistons 268 of the lifting cylinders and the respectively foremost stock bar 240 can be lifted over the stop 264 so that it can roll into the open guide passage 224 of the receiving box 208 located in position 5. FIG. 4 shows the state of the feeding apparatus 200 after a new stock bar 240 has just rolled into the opened receiving box located in position 5, the pistons 268 have, however, already taken up their lower end positions.

After that, the actuating device 246 closes the receiving box 208 located in position 5 by extending the piston rod of the pressure-medium cylinder 248.

Once the receiving box 208 which has just been loaded with a new stock bar 240 has been indexed from position 5 into position 6, this receiving box will be pushed into its front end position in position 6 by a pushing-in device designated as a whole as 270, namely together with the new stock bar 240, and when this receiving box moves into the front end position its locking device 232 will be locked again, as has already been described, because its foremost locking rod 238 strikes the front end wall 211 of the feeding apparatus 200 located opposite the rear wall 210 and is moved backwards relative to the receiving box.

The pushing-in device 270 has an outer Z-carriage 274 which is held by two guide bars 276 and guided for displacement in the direction of the Z-axis, i.e. in the direction of the indexing axis 202. The two guide bars 276, which are intended to extend parallel to one another and parallel to the indexing axis 202, can be secured to the rear wall 210 and to the front end wall 211 of the feeding apparatus 200 located opposite thereto and a hydraulic cylinder 74' corresponding to the pushing-in cylinder 74 of the first embodiment according to FIGS. 1–3 can be provided (cf. FIG. 5) for moving the Z-carriage 274 back and forth in the direction of the indexing axis 202; the bars 276 can, however, also be the piston rods of two pressure-medium cylinders which are arranged parallel to one another and activated synchronously and which can hold the Z-carriage 274 and be secured to one or both end walls of the feeding apparatus 200. A carriage-like frame 280 is guided in the Z-carriage 274 for displacement in a direction radial to the indexing axis 202, namely in the radial direction associated with position 6—the pushing-in device 270 which is present only once for all the receiving boxes 208 is, therefore, associated with position 6.

FIG. 4 shows the frame 280 in its radially inner end position in relation to the indexing axis 202, from which it can be displaced to the left according to FIG. 4 into a radially outer end position with the aid of a pressure-medium cylinder 284 attached to the Z-carriage 274. A clamping claw 286 is secured to the frame 280; this has two claw arms 286a and 286b which are designed as two-armed levers pivotable about joint axes 288 and 290. The joint axes 288 and 290 extend parallel to the indexing axis 202 and are secured to the frame 280. The left ends, according to FIG. 4, of the claw arms 286a and 286b are acted upon by pressure springs 292a and 292b which are, on the other hand, supported on the frame 280 and consequently attempt to open the clamping claw 286—FIG. 4 shows the clamping claw in the opened state in which it may be pushed in radial direction over a stock bar 240 located in the guide passage 224 of the receiving box 208 located in position 6. Finally, the pushing-in device 270 has a pressure-medium cylinder 294 which, like the pressure-medium cylinder 96 of the first embodiment, serves to close the clamping claw 286 so that it firmly grips the stock bar 240 of the receiving box 208 located in position 6. The cylinder housing of the pressure-medium cylinder 294 is secured to the upper claw arm 286a while its piston rod abuts against the lower claw arm 286b.

So that the pushing-in device 270 can push a receiving box 208 located in position 6 forwards into the front end position vertically to the plane of drawing of FIG. 4, i.e. in the direction of the indexing axis 202, and withdraw it from the rear end position, a two-armed locking lever 300 is articulated to each receiving box 208. The pivot axis 300a of the lever likewise extends parallel to the indexing axis 202 and the lever is held on the foot 214 or rather on the lower receiving channel 216 of the receiving box so as to be axially non-displaceable. It is subject to the action of a volute spring 302 which encompasses the pivot axis 300a and attempts to pivot the locking lever 300 in the clockwise direction according to FIG. 4 so that the locking lever normally abuts against the longitudinal guide rail 212 adjacent to it. These longitudinal guide rails have detent grooves 304 associated with the front and rear end positions of the receiving boxes 208; of these detent grooves FIG. 4 shows only the detent grooves associated with the respective front end positions of the receiving boxes 208. The end of each locking lever 300 pointing radially outwards forms a coupling fork 306 having two arms which are located one behind the other in the direction of the indexing axis 202 and each of which is provided with a groove 308. When the clamping claw 286 moves forward into its front or radially inner end position illustrated in FIG. 4, a coupling pin 310 which is borne by the upper claw arm 286a and extends in axial direction is moved into the grooves 308, whereby the radially inner end of the upper claw arm 286a is inserted between the two arms of the coupling fork 306 of that receiving box 208 which is located in position 6. When the clamping claw 286 is closed with the aid of the pressure-medium cylinder 294, the locking lever 300 of the receiving box 208 located in position 6 is pivoted contrary to the action of the volute spring 302 in the counterclockwise direction so that it is lifted out of the relevant detent groove 304 and, consequently, this receiving box may be displaced in the direction of the indexing axis 202. When the clamping claw 286 is moved forwards into its position illustrated in FIG. 4, the clamping claw is, however, also coupled in axial direction, i.e. in the direction of the indexing axis 202, with the receiving box 208 located in position 6, namely in both axial directions, so that a receiving box 208 located in position 6 may be not only moved forwards but also drawn backwards with the aid of the pushing-in device 270.

As for the rest, the second embodiment of the inventive stock bar feeding apparatus 200 illustrated in FIGS. 4 and 5 operates as follows:

FIG. 4 shows that state of the feeding apparatus 200 which results once the control common to the multiple spindle automatic lathe and the feeding apparatus 200 has received the signal that a workpiece spindle of the main spindle drum of the automatic lathe can be reloaded with a new stock bar because the stock bar previously worked has been used up. Furthermore, it is assumed for FIG. 4 that the receiving box 208 associated with the workpiece spindle to be reloaded has already been withdrawn by the hydraulic cylinder 74' into its rear end position and unlocked. The relevant receiving box 208 in position 5 will be opened with the aid of the actuating device 246 and loaded with a new stock bar 240 by the magazine 260, if necessary following several idle cycles, during which the magazine drum 204 is indexed in the direction R without this receiving box receiving a stock bar, whereupon the receiving box in position 5 is again closed. Once the magazine drum 204 has been indexed further by one indexing step, the receiving box 208 under consideration is located in position 6 but it is still in its rear end position adjacent the rear wall 210. The pushing-in device 270 which has taken up its radially outer end position during the indexing of the magazine drum 204 is now moved radially forwards into its inner end position with the aid of the pressure-medium cylinder 284 once it has, if necessary, been displaced on the guide bars 276 beforehand into its rear end position adjacent the rear wall 210. The radial displacement of the pushing-in device 270 into the front or inner end position illustrated in FIG. 4 takes place when the clamping claw 286 is open so that this can be pushed over the new stock bar 240. In this connection, reference is made to the fact that at this moment the clamping claw 286, like the clamping claw 94 of the first embodiment, is intended to be located, in axial direction, in front of or behind the receiving box 208 under consideration, preferably directly in front of the front end of this receiving box.

At this point, reference is made to the fact that two actuating devices are provided for the second embodiment according to FIG. 4, one of which serves to open and close the receiving box and the other to actuate the clamping claw, whereas, in the first embodiment according to FIGS. 1–3, one and the same actuating device, namely the pressure-medium cylinder 96 together with the coupling rods 100, 102 opens and closes not only the receiving box 60 but also the clamping claw 94. For embodiments which are intended to cooperate with a multiple spindle automatic lathe, two actuating devices are recommendable because the unproductive idle times can thereby be shortened in that in one position of the receiving box under consideration this is opened up, loaded and closed again and in that, in addition, in the next or one of the next positions the new stock bar is grasped by the clamping device and the receiving box displaced.

Once the clamping claw 286 has reached its inner end position illustrated in FIG. 4, it is closed with the aid of the pressure-medium cylinder 294 and thus the new stock bar 240 clamped in the clamping claw. Subsequently, the pushing-in device 270 is pushed forwards by the hydraulic cylinder 74', whereby it takes along, via the clamping claw 286, the receiving box 208 located in position 6 and the new stock bar 240 accommodated thereby until the receiving box has reached its front end position and has again been locked by the locking rods 238. Subsequently, the pressure-medium cylinder 294 is reversed so that the clamping claw 286 releases the new stock bar 240. When the receiving box 208 and the new stock bar 240 are moved forwards, the latter is pushed into the workpiece spindle of the automatic lathe which is to be reloaded so that the section-wise working of the new stock bar can begin once the stock bar is clamped in this workpiece spindle.

In the embodiment according to FIG. 4, the magazine drum 204 and the constructional units rotating with it about the indexing axis 202 do not, therefore, include any active elements at all since all the drives, such as the various pressure-medium cylinders, are arranged or rather can be arranged outside the paths of movement of the constructional units rotating with the magazine drum 204. However, no workpiece is produced with the workpiece spindle to be reloaded during a rotation of the main spindle drum of the automatic lathe through 360°.

FIG. 5 shows, apart from the stock bar feeding apparatus 200, only the parts of a multiple spindle automatic lathe 10' which are essential for understanding the invention, namely a main spindle drum 12' which can be indexed, i.e. rotated, about the indexing axis 202 in accordance with a cycle and has six workpiece spindles 16', of which only two are illustrated in FIG. 5. The axes of rotation 14' of the workpiece spindles 16' are always aligned with the axes 226 of the guide passages 224 of the feeding apparatus 200.

The inventive stock bar feeding apparatus which is suitable for a multiple spindle automatic lathe therefore has, in addition, the following essential features: no active elements, such as drives and sensors, on the magazine drum or rather on the receiving boxes. The procedure of loading a receiving box with a new stock bar is divided between several indexing positions of the magazine drum or rather the main spindle drum (for example, in the illustrated embodiment, a receiving box is loaded with a new stock bar in position 5, a receiving box which is now empty can be moved in position 6 into its rear end position, in which it then arrives at position 5 when the magazine drum 204 is rotated, and in position 6 a receiving box loaded with a new stock bar is moved into its front end position together with the stock bar). Only one single clamping device is provided and this is, in particular, combined with a single pushing-in device. Particular advantages result when the clamping device can perform three movements (in radial direction forward and back, in axial direction forward and back as well as opening and closing, respectively). A coupling device between clamping device and receiving boxes enables the receiving boxes to be displaced as well as locked and unlocked. Finally, means are provided which prevent unlocked receiving boxes from swinging open during the indexing of the magazine drum.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. Apparatus for feeding bar-shaped stock in a feeding direction coinciding with the longitudinal direction of a stock bar to a machining station of a machine tool, said apparatus comprising an elongated receiving and guiding box supported by a fracas and extending in said feed direction, said box having a receiving and guiding passage for receiving a new stock bar and for guiding stock bar in said feed direction in the course of machining said stock bar in said machining station, said guiding passage extending in said feed direction and being open at least at a front end of said box facing the machining station, said box being divided in longitudinal direction and having at least two elongated wall elements extending in said feed direction, each of said wall elements having an inner side facing said guiding passage and providing an elongated channel extending in said feed direction, said apparatus further comprising an actuating device for opening and closing said box by moving at least one of said wall elements transversely to the feed direction such that a new stock bar is insertable into the open box in a direction transverse to the longitudinal direction of said stock bar, and a pushing-in device for pushing a new stock bar in said feed direction into said machine tool, wherein a controllably closable and openable clamping device is associated with said box for securing a new stock bar in place within said box, said box being guided on said frame for displacement in said feed direction and being movable by the pushing-in device in said feed direction and opposite thereto.

2. The apparatus of claim 1, wherein said guiding passage has a diameter corresponding to the diameter of a stock bar of maximum diameter machinable on the machine tool, and wherein said guiding passage is provided with holding means for holding a set of interchangeable bushing elements within said passage, each of said bushing elements having a curved cross section for being inserted into one of said channels so that the bushing elements of said set define an internal passageway with a predetemined inside diameter for receiving a stock bar, and with a plurality of different sets of bushing elements for providing internal passageways of different inside diameter for receiving stock bars of different diameter.

3. The apparatus of claim 1, wherein said box is movable on said frame in said feed direction between a rear end position remote from said machining station, and a front end position closer to the machining station, a flew stock bar being insertable into said box when the box is in said rear end position.

4. The apparatus of claim 3, wherein at least one locking element is associated with said wall elements for keeping said box closed, and with a front actuating element associated with said front end position and a rear actuating element associated with said rear end position for actuating said locking element such that said wall elements are automatically locked against one another when said box is in said front end position and automatically unlocked when said box is in said rear end position.

5. The apparatus of claim 1, wherein said box is formed by two wall elements articulatedly connected to one another at first longitudinal sides thereof by a hinge joint having a joint axis extending in said feed direction.

6. The apparatus of claim 4, wherein said box is formed by two wall elements articulatedly connected to one another at first longitudinal sides thereof by a hinge joint having a joint axis extending in said feed direction, said wall elements being provided at second longitudinal sides thereof located opposite said hinge joint with a hinge frame-type locking device having (i) an axis extending in said feed direction, (ii) a plurality of hinge frame elements and (iii) a plurality of rod-like locking elements arranged in abutting relationship one after the other in said feed direction, each of said hinge frame elements having one of said locking elements associated therewith, said locking elements being longitudinally movable within said hinge frame elements in said feed direction, and wherein said actuating elements for said locking device are stops stationary relative to said frame for acting on terminal ones of said locking elements such that contact points of adjacent locking elements are located (i) between said hinge frame elements when said box is in said rear end position, and (ii) within said hinge frame elements when said box is in said front end position.

7. The apparatus of claim 1, having (i) a stock bar magazine to be arranged adjacent said box and having an inclined slide surface sloping downwards in a direction towards said box for supporting a plurality of stock bars arranged next to one another and oriented parallel to said feed direction, and (ii) a loading device for loading the stock bar being nearest to said box from said slide surface into the open box.

8. The apparatus of claim 7, having a stock bar stop associated with a lower edge of said slide surface facing said box, and at least one lifting element for lifting only the stock bar being nearest to said stock bar stop over said stop into the open box, said lifting element being movable between an inoperative lower end position and an upper end position.

9. The apparatus of claim 8, wherein said lifting element has an inclined supporting surface sloping downwards in a direction towards said box for supporting the stock bar being nearest to said stock bar stop, said supporting surface being located at a level not exceeding the level of said lower edge of said slide surface when said lifting element is in said lower end position, whereas in said upper end position said inclined supporting surface is at a level such that a stock bar located on said supporting surface moves by gravity into said box when the box is open.

10. The apparatus of claim 3, having (i) a stock bar magazine to be arranged adjacent said box and having an inclined slide surface sloping downwards in a direction towards said box for supporting a plurality of stock bars arranged next to one another and oriented parallel to said feed direction, and (ii) a loading device for loading the stock bar being nearest to said box from said slide surface into the open box, and wherein, when said box is in said rear end position and contains a stock bar projecting beyond the front end of the box towards said machining station by a length sufficient for inserting a new stock bar into said machining station by advancing said box into said front end position, a front edge of said slide surface facing said machining station is spaced from the front end of said box by a distance, measured in said feed direction, corresponding to said length by which said stock bar projects beyond said front end of the box.

11. The apparatus of claim 1, wherein said clamping device is arranged in front of said box towards said machining station.

12. The apparatus of claim 1, wherein said clamping device comprises a clamping claw with two claw arms, at least one of said claw arms being pivotable about a pivot axis of said clamping claw.

13. The apparatus of claim 1, wherein said clamping device is displacable in said feed direction together with said box.

14. The apparatus of claim 5, wherein said clamping device comprises a clamping claw with two claw arms, at least one of said claw arms being pivotable about a pivot axis of said clamping claw, and wherein said clamping device is displacable in said feed direction together with said box, said pivot axis being aligned with the axis of said hinge joint.

15. The apparatus of claim 14, wherein said hinge joint has a link rod defining the axis of the hinge joint, said link rod supporting said clamping claw.

16. The apparatus of claim 13, wherein said clamping device is actuatable by said actuating device for opening and closing said box.

17. The apparatus of claim 16, wherein said clamping device comprises a clamping claw with two claw arms, at least one of said claw arms being pivotable about a pivot axis of said clamping claw, each of said claw arms being coupled to one of said wall elements by a mechanical coupling device having a play transversely to the direction of the pivot axis of said clamping claw arms.

18. The apparatus of claim 17, wherein said actuating device engages on said clamping claw.

19. The apparatus of claim 18, wherein said actuating device is a pressure-medium cylinder device carried by said clamping claw, said cylinder device having a cylinder and a piston with a piston rod, said piston rod being articularedly connected to a first one of said claw arms and said cylinder being articulatedly connected to a second one of said claw arms.

20. The apparatus of claim 1 for a multiple spindle automatic lathe having a spindle drum rotatable about a central indexing axis and bearing a plurality of workpiece spindles parallel to said indexing axis, and drum drive means for rotating said drum about said indexing axis and for positioning said drum in a number of indexing positions corresponding to the number of workpiece spindles, said apparatus comprising a stock bar carrier forming said frame and being rotatable about said indexing axis together with said workpiece spindles, said carrier being provided for each of said workpiece spindles with a stock bar receiving box having a stock bar guiding passage aligned with the workpiece spindle associated with said box.

21. The apparatus of claim 20, wherein said spindle drum forms said stock bar carrier.

22. The apparatus of claim 20, wherein only a single actuating device being separate from said stock bar carrier is provided for opening and closing of all of said receiving boxes, said actuating device being associated with a first receiving box position corresponding to one of said indexing positions.

23. The apparatus of claim 22, having (i) a single stock bar magazine being separate from said stock bar carrier and associated with said first receiving box position, said magazine having an inclined slide surface for supporting a plurality of stock bars arranged next to one another and oriented parallel to said feed direction, said slide surface sloping downwards in a direction towards a receiving box being in said first receiving box position, and (ii) a loading device for loading the stock bar being nearest to said receiving box position from said slide surface into the open box.

24. The apparatus of claim 20, wherein only a single clamping device being separate from said stock bar carrier is provided and associated with a receiving box position corresponding to one of said indexing positions.

25. The apparatus of claim 24, wherein said clamping device is associated with a second receiving box position following said first receiving box position in indexing direction of said spindle drum.

26. The apparatus of claim 24, wherein only a single pushing-in device being separate from said stock bar carrier is provided and associated with the receiving box position associated with said clamping device, said apparatus having coupling means for coupling each of said receiving boxes one after the other with said pushing-in device in the direction of said indexing axis.

27. The apparatus of claim 22, wherein said actuating device for opening and closing said boxes is arranged outside paths of movement of all parts rotatable together with said stock bar carrier about said indexing axis.

28. The apparatus of claim 23, wherein said stock bar magazine is arranged outside paths of movement of all parts rotatable together with said stock bar carrier about said indexing axis.

29. The apparatus of claim 26, wherein said pushing-in device is arranged outside paths of movement of all parts rotatable together with said stock bar carrier about said indexing axis.

30. The apparatus of claim 24, wherein said clamping device is arranged outside paths of movement of all parts rotatable together with said stock bar carrier about said indexing axis.

31. The apparatus of claim 30, wherein said clamping device comprises a clamping claw with two claw arms, at least one of said claw arms being pivotable about a pivot axis of said clamping claw, and wherein said claw arms are adapted to be pushed forwards transversely to said indexing axis over a stock bar held by one of said receiving boxes when said clamping claw is in an open condition.

32. The apparatus of claim 26, wherein said clamping device is displacable in said feed direction by said pushing-in device together with one of said receiving boxes.

33. The apparatus of claim 20, wherein each of said receiving boxes is movable on said frame in said feed direction between a rear end position remote from said machining station and a front end position closer to the machining station, said apparatus having locking means at each of said receiving boxes, and wherein for each of said locking means said stock bar carrier is provided with (i) a front detent means associated with the front end position of the respective one of said boxes and (ii) a rear detent means associated with the rear end position of the respective one of said boxes, said locking means being actuatable by said clamping device.

34. The apparatus of claim 20, wherein each of said receiving boxes is movable on said frame in said feed direction between a rear end position remote from said machining station and a front end position closer to the machining station, said apparatus having locking means at each of said receiving boxes, and wherein for each of said locking means said stock bar carrier is provided with (i) a front detent means associated with the front end position of the respective one of said boxes and (ii) a rear detent means associated with the rear end position of the respective one of said boxes, said locking means being actuatable by said pushing-in device.

35. The apparatus of claim 6 for a multiple spindle automatic lathe having a spindle drum rotatable about a central indexing axis and bearing a plurality of workpiece spindles parallel to said indexing axis, and drum drive means for rotating said drum about said indexing axis and for positioning said drum in a number of indexing positions corresponding to the number of workpiece spindles, said apparatus comprising a stock bar carrier forming said frame and being rotatable about said indexing axis together with said workpiece spindles, said carrier being provided for each of said workpiece spindles with a stock bar receiving box having a stock bar guiding passage aligned with the workpiece spindle associated with said box, wherein said stop associated with said rear end position of said receiving boxes is provided with a guide means for said locking elements, said guide means being concentric with said indexing axis.

36. The apparatus of claim 35, wherein said stop is an annular groove concentric with said indexing axis and forming said guide means, said annular groove opening in feed direction and being engaged by a rear locking element of a receiving box being in said rear end position.

37. The apparatus of claim 35, wherein only a single actuating device being separate from said stock bar carrier is provided for opening and closing all of said receiving boxes, said actuating device being associated with a first receiving box position corresponding to one of said indexing positions, and wherein said guide means has a guide segment disposed adjacent said first receiving box position, said guide segment being part of said actuating device and movable for opening and closing of a receiving box located in said first receiving box position.

38. The apparatus of claim 37, wherein said guide segment is pivotable and provided with a drive.

* * * * *